United States Patent [19]
Lin

[11] Patent Number: 6,108,868
[45] Date of Patent: Aug. 29, 2000

[54] POSITIONING HINGE HAVING A CAM BLOCK

[76] Inventor: Davys Lin, No. 105, Wen-Hua St., Chiung-Lin Hsiang, Hsinchu County, Taiwan

[21] Appl. No.: 09/275,702

[22] Filed: Mar. 24, 1999

[30] Foreign Application Priority Data

Mar. 30, 1998 [CN] China ................................. 87204655
Dec. 22, 1998 [CN] China ................................. 87221330

[51] Int. Cl.[7] ............................. E05D 11/08; E05C 17/64
[52] U.S. Cl. ................................. 16/340; 16/334; 16/335; 16/341; 16/327; 248/917; 248/919; 361/681; 403/119; 403/121
[58] Field of Search ............................. 16/340, 335, 334, 16/341, 342, 325, 327; 361/681, 682, 683, 686; 248/183, 917, 923; 403/119, 120, 146, 121

[56] References Cited

U.S. PATENT DOCUMENTS

| | | | |
|---|---|---|---|
| 3,905,064 | 9/1975 | Brackhaus | 16/334 |
| 4,846,536 | 7/1989 | Saitou et al. | 361/682 |
| 5,077,551 | 12/1991 | Saitou | 361/681 |
| 5,239,731 | 8/1993 | Lu | 16/340 |
| 5,651,063 | 7/1997 | Ji et al. | 16/342 |
| 5,715,575 | 2/1998 | Kubota | 16/342 |
| 5,987,704 | 11/1999 | Tang | 16/342 |

*Primary Examiner*—Chuck Y. Mah
*Attorney, Agent, or Firm*—Ladas & Parry

[57] ABSTRACT

Disclosed is a positioning hinge for use in a portable computer or an electronic dictionary having a main unit and an LCD display, the hinge comprising a pivotal member for mounting the hinge to the main unit; a substantially disk-shaped cam block non-rotatably provided around the pivotal member; a pivotal base rotatably for mounting the hinge to the LCD display. By biasing against the cam block, this invention allows the LCD display of a portable computer to pivot with respect to the main unit so as to adjust the orientation of the LCD display e. This invention can be simply assembled, includes a low number of components, and is of a relatively compact size.

35 Claims, 12 Drawing Sheets

POSITIONING HINGE HAVING A CAM BLOCK

FIELD OF INVENTION

This invention relates to a positioning hinge having a cam block, in particular to a positioning hinge for pivoting between a main unit and an LCD display of a portable computer or electronic dictionary.

BACKGROUND OF INVENTION

LCD displays of conventional portable computers are generally pivotally assembled on main units by a pair of hinges. While using a computer, a user must manually lift the LCD display to a position that forms an angle in relation of the main unit. Such an operation is somewhat inconvenience.

Furthermore, the hinges must be adjusted to attain an appropriate torsion in order to assure that the LCD display may maintain at a desired position and to allow the user to effortlessly lift and lower the LCD display. How to adjust the hinges to attain an appropriate torsion while assembling computers, is a major problem that needs to be resolved in quality control.

Since LCD displays have the advantages of compact size and the manufacturing cost of LCD displays has reduced greatly due to developed techniques, LCD displays are now implemented in computers other than portable computers. It is thus compelling that solutions for resolving the above problems are to be sought immediately.

SUMMARY OF INVENTION

It is therefore an object of this invention to provide an auto-liftable positioning hinge having a cam block featuring the following features: to allow auto-lifting of the LCD display of a portable computer, and to allow a user to adjust the orientation of the LCD display when the LCD display is resiliently lift to a fixed angle so as to adapt to ambient lighting.

To attain the above functions, the cam block biased positioning hinge of this invention mainly comprise a pivotal member, a pivotal base, a torsion spring, a cam block, a resilient friction member, and a fastening member.

According to one embodiment of this invention, the pivotal member is secured to a main unit; the cam block is substantially in a disk shape and non-rotatably provided around the pivotal member; the pivotal base is secured to the LCD display and is rotatable between a first position and a second position about the pivotal member; the resilient friction member is secured to the pivotal base to resiliently urge against the cam block; the torsion spring is biasedly provided around the pivotal member, wherein the torsion spring is under torsion state when the pivotal base is at the first position, and under relaxed state when the pivotal base is at the second position.

According to a further embodiment of this invention, the pivotal member secured to the main unit mainly includes a rotary shaft, and the pivotal base secured to the LCD display mainly includes a first support formed with pivotal openings, wherein the first support is substantially perpendicular to the pivotal member and is formed with a pivotal opening through which the rotary shaft passes to allow pivotal motion. Opposing ends of the torsion spring, respectively, urge against and connect to the pivotal member and pivotal base to provide torsion force for relative rotation between the pivotal member and the pivotal base so as to subject relative pivotal motion between the LCD display and the main unit. The cam block provides a cam-configured, frictional surface and is formed with a through hole, through which the rotary shaft non-rotatably passes. The resilient friction member includes an end that is secured to the pivotal base and another end that biases against the cam-configured surface so as to maintain frictional, sliding movement with the cam block when the pivotal base pivots about the pivotal member. The fastening member is secured to a free end of the rotary shaft so as to lock and secure all the remaining members to the rotary shaft.

According to a further embodiment of this invention, the cam block is substantially configured in a smooth heart shape forming a positioning recess at a top of the cam block. The resilient friction member has a friction end that varies its frictional force with respect to the heart-shape cam block while the friction end maintains frictional, sliding movement with the cam block and then stops within the positioning recess.

This invention can be simply assembled, includes a low number of components, and is of a relatively compact size. The characterized features and other advantages of this invention may be realized from the accompanying explanations, drawings and claims.

EXPLANATIONS OF PREFERRED EMBODIMENTS

Figure 1:
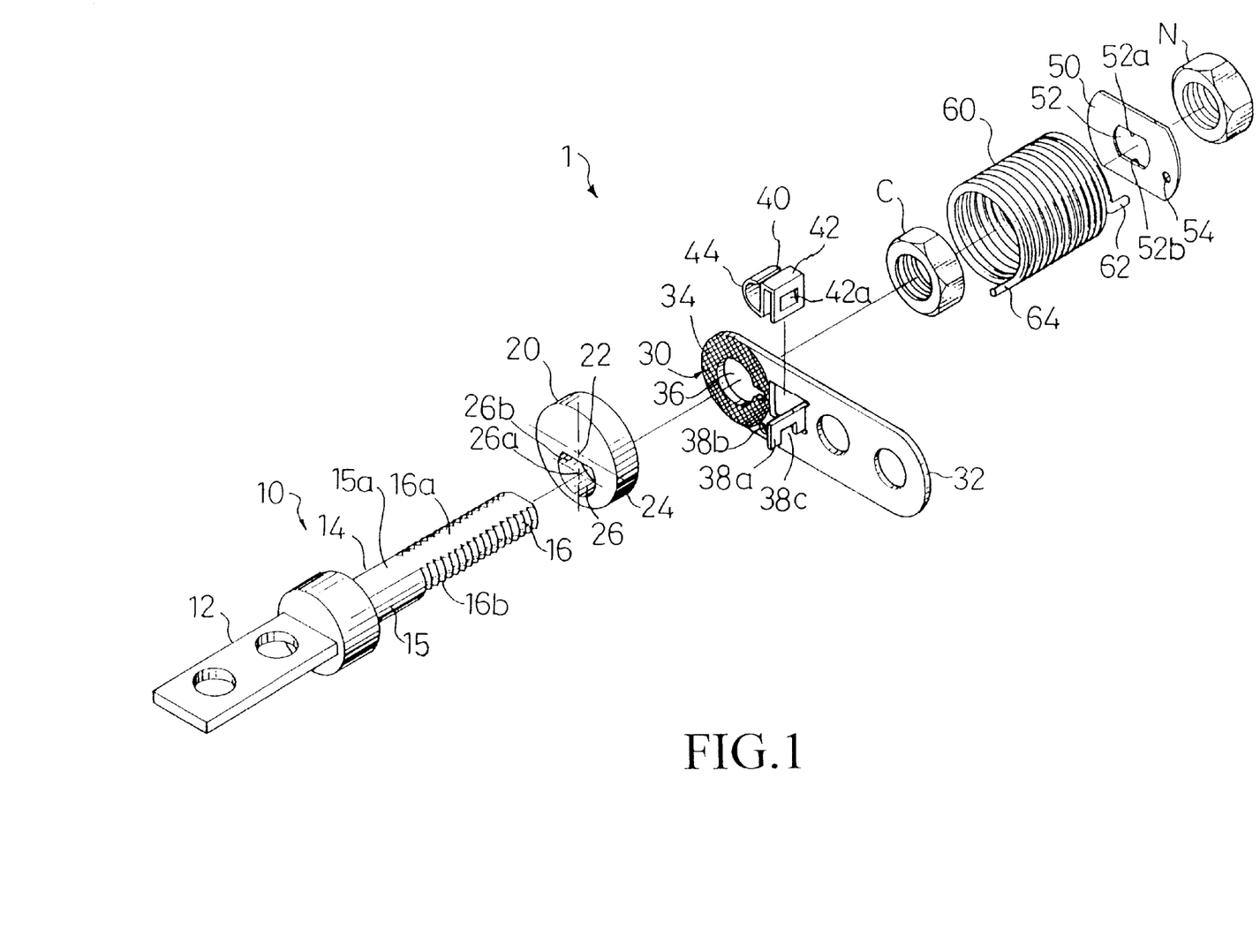
FIG. 1 is an exploded perspective view of an embodiment of a positioning hinge of this invention.

FIG. 1 is an exploded perspective view of an embodiment of a positioning hinge 1 of this invention. The hinge 1 comprises a pivotal member 10, a cam block 20, a pivotal base 30, a resilient friction member 40, a non-rotatable washer 50; a torsion spring 60; and fastening members C, N.

The pivotal member 10 includes a mounting end 12 for mounting the hinge 1 to a main unit M (see FIG. 6) to be assembled; a rotary shaft 14 including a non-threaded portion 15 and a threaded portion 16, wherein the non-threaded portion 15 is formed with a flatten top 15a, and the threaded portion 16 is formed with a flatten top 16a and a flatten bottom 16b. The rotary shaft includes a pivotal axis.

The cam block 20 is in a substantially disk shape and may be made of plastic materials having frictional and damping characteristics. The cam block 20 has a center 22 and a peripheral wall 24. The cam block 20 is formed with a semi-circular opening 26 that is eccnetrically formed on the cam block 20 and that has a center 26a and a flatten edge 26b. After the cam block 20 is assembled on the non-threaded portion 15 of the pivotal member 10, the flatten top 26b is in compliant with the flatten top 15a of the non-threaded portion 15 of the pivotal member 10 such that the cam block 20 is non-rotatably provided around the pivotal member 10.

The pivotal base 30 includes a mounting end 32 for mounting the pivotal base 30 to an LCD display D (see FIG. 6) and a support 34 formed thereon with a substantially circular opening 36 in which the rotary shaft 14 is pivotably received. The opening 36 may be knurled around surrounding surfaces thereof to contain lubricant. The pivotal base 30 further includes a medial portion 38 formed with an ear 38a projecting towards the cam block 20, and a first mounting hole 38b. After the pivotal base 30 is assembled on the non-threaded portion 15 of the pivotal member 10, the circular opening 36 allows the pivotal base 30 to rotate about the pivotal axis of the pivotal member 10 between a first position (i.e., the LCD display being at a closed state) illustrated by solid lines in FIG. 2 and a second position (i.e., the LCD display being at an open state) illustrated by phantom lines in FIG. 2.

Figure 2:
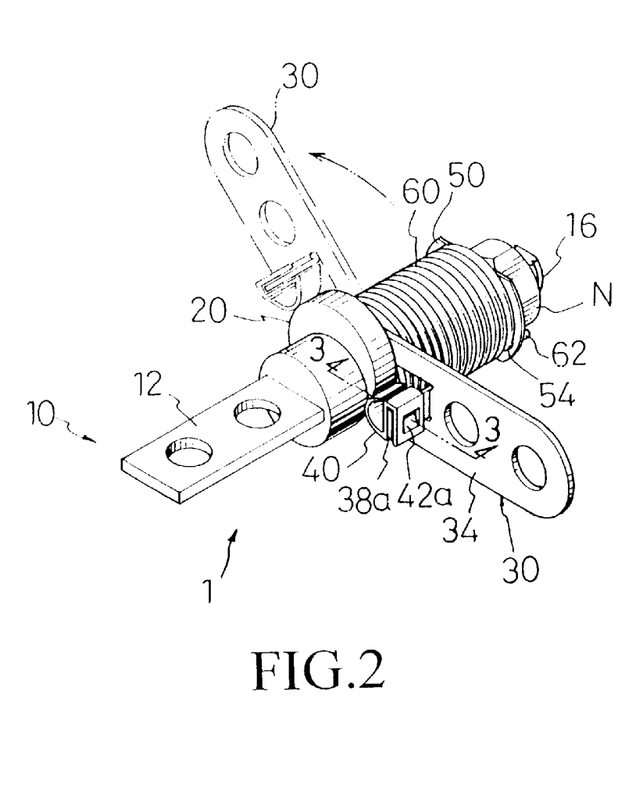
FIG. 2 is an assembled perspective view of the embodiment illustrated in FIG. 1.
Figure 3:
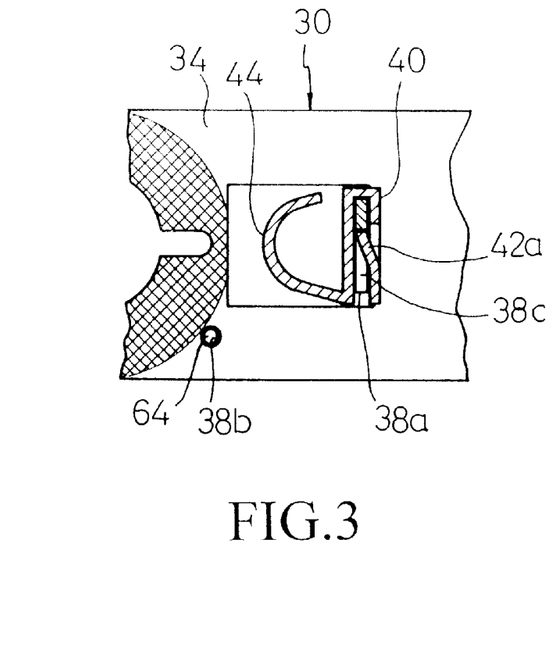
FIG. 3 is a cross-sectional view taken along line 3—3 of FIG. 2.

The resilient friction member 40 is mainly made of resilient materials, and includes a mounting end 42 for mounting on the ear 38a and a resilient end 44 for resiliently urging against the peripheral wall 24 of the cam block 20. FIG. 3 is a cross-sectional view taken along line 3—3 of FIG. 2 illustrating the resilient friction member 40 being mounted on the ear 38a. As illustrated in FIGS. 1 to 3, the ear 38a is formed at bottom thereof with a notch 38c, in which an inclined tab 42a formed on the mounting end 42 of the resilient friction member 40 is engaged. Other known mounting means may also be utilized, such as screws or rivets so as to mount the resilient friction member 40 on the ear 38a.

The non-rotatable washer 50 is formed with an oblate opening 52 having a flatten top edge 52a and a flatten bottom edge 52b and a second mounting hole 54. After the non-rotatable washer 50 is assembled on the threaded portion 16 of the pivotal member 10, the flatten top edge 52a and the flatten bottom edge 52b of the oblate opening 52 are in compliant with the flatten top 16a and the flatten bottom 16b of the threaded portion 16 of the pivotal member 10 such that the non-rotatable washer 50 is non-rotatably provided around the pivotal member 10.

The fastening member C is threaded on the threaded portion 16 of the pivotal member 10 for securing the cam block 20 and the pivotal base 30 to the non-threaded portion 15 of the pivotal member 10.

The torsion spring 60 is biasedly provided around the threaded portion 16 of the pivotal member 10 in relation to the pivotal member 10. In this embodiment, the torsion spring 60 is provided between the pivotal base 30 and the non-rotatable washer 50. The torsion spring 60 has a first end 62 mounted on the second mounting hole 54 of the non-rotatable washer 50 and a second end 64 mounted on the first mounting hole 38b of the pivotal base 30. Other conventional means may also be adopted to biasedly provide the torsion spring 60 in relation to the pivotal member 10.

Finally, the fastening member N is threaded on the threaded portion 16 of the pivotal member 10 for securing the non-rotatable washer 50 and the torsion spring 60 between the fastening members C, N. When the pivotal base 30 is located in a first position as that illustrated by solid lines of FIG. 2, the torsion spring 60 is under torsion state, whereas the pivotal base 30 is located in a second position as that illustrated by phantom lines of FIG. 2, the torsion spring 60 is under relaxed state.

Figure 4:
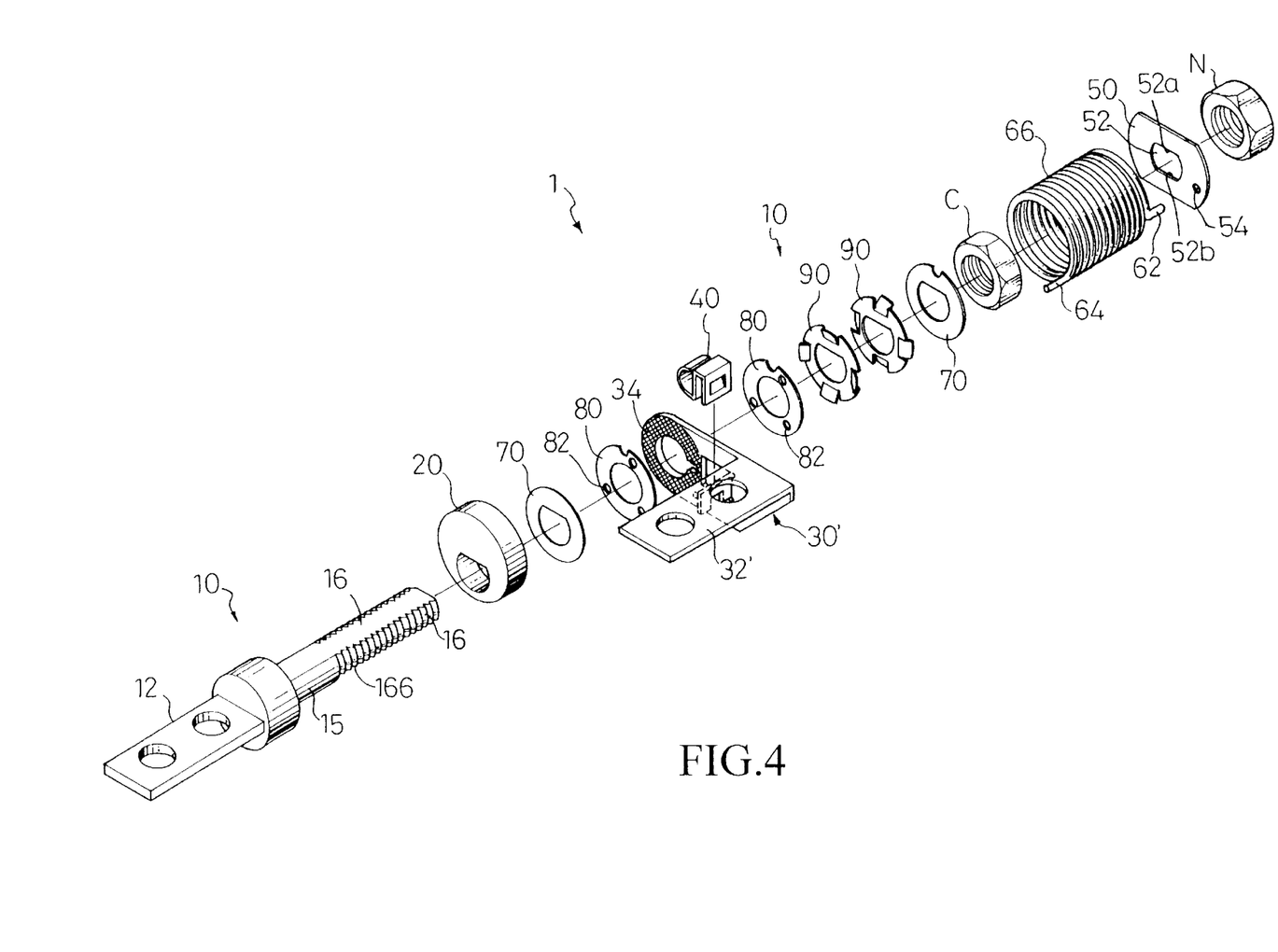
FIG. 4 is an exploded perspective view of an alternative embodiment of a positioning hinge of this invention.
Figure 5:
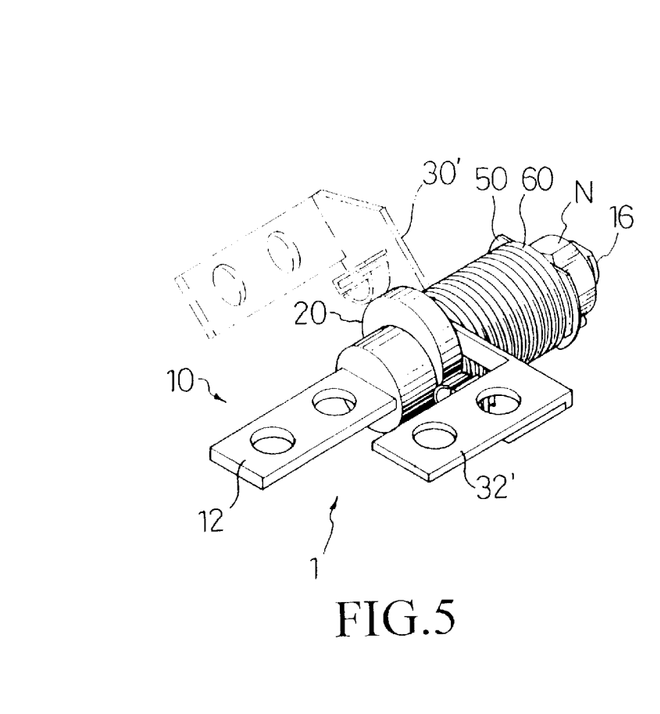
FIG. 5 is an assembled perspective view of the embodiment illustrated in FIG. 4.

FIG. 4 is an exploded perspective view of an alternative embodiment of a positioning hinge 1 of this invention. FIG. 5 is an assembled perspective view of the positioning hinge 1 of FIG. 4. The hinge 1 illustrated in FIG. 4 is different from that illustrated in FIG. 1 in the pivotal base 30' which includes a mounting end 32' that forms an angle with the support 34 of the pivotal base 30' so as to adapt to different computer constructions.

Figure 7:
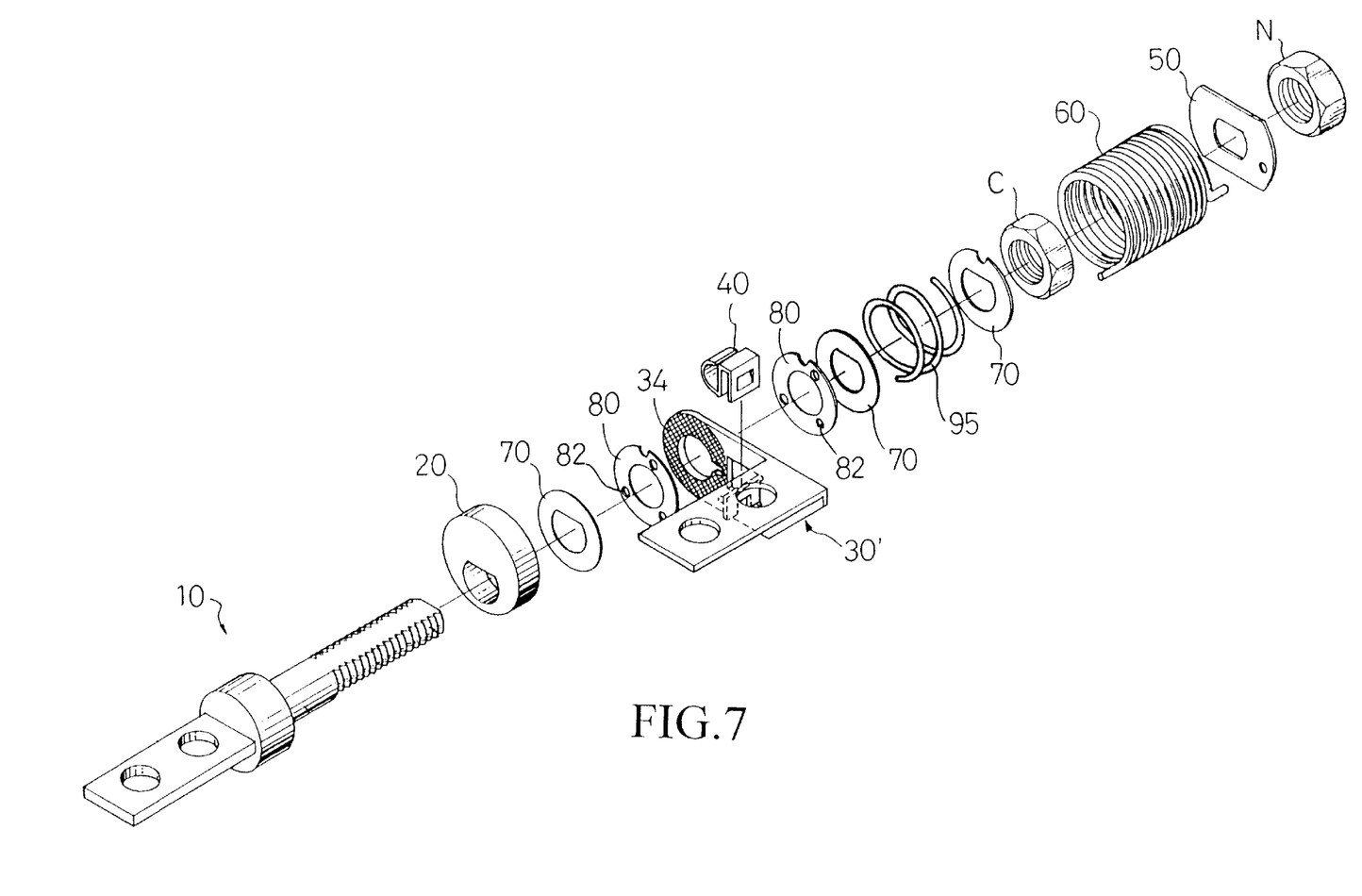
FIG. 7 is a exploded perspective view of a further embodiment of this invention.

The hinge 1 illustrated in FIG. 4 further comprises locking washers 70, lubricating washers 80, and tooth-shaped resilient tabs 90. The locking washers 70 are provided around opposing sides of the pivotal base 30' to enhance locking effect. The lubricating washers 80 are rotatably provided around opposing sides of the pivotal base 30' and formed with a plurality of lubricant openings 82 for containing additional lubricant that provides lubricating effect. The tooth-shaped resilient tabs 90 are provided between the pivotal base 30' and the fastening member C to provide torsion adjustment of the pivotal member 10 in an axial direction of the pivotal member. FIG. 7 is an exploded perspective view of an alternative embodiment of a positioning hinge 1 of this invention. In this embodiment, the tooth-shaped resilient tabs 90 of FIG. 4 are replaced with a compression spring 95 between the pivotal base 30' and the fastening member C so as to provide torsion adjustment of the pivotal member 10 in an axial direction of the pivotal member.

Figure 6:
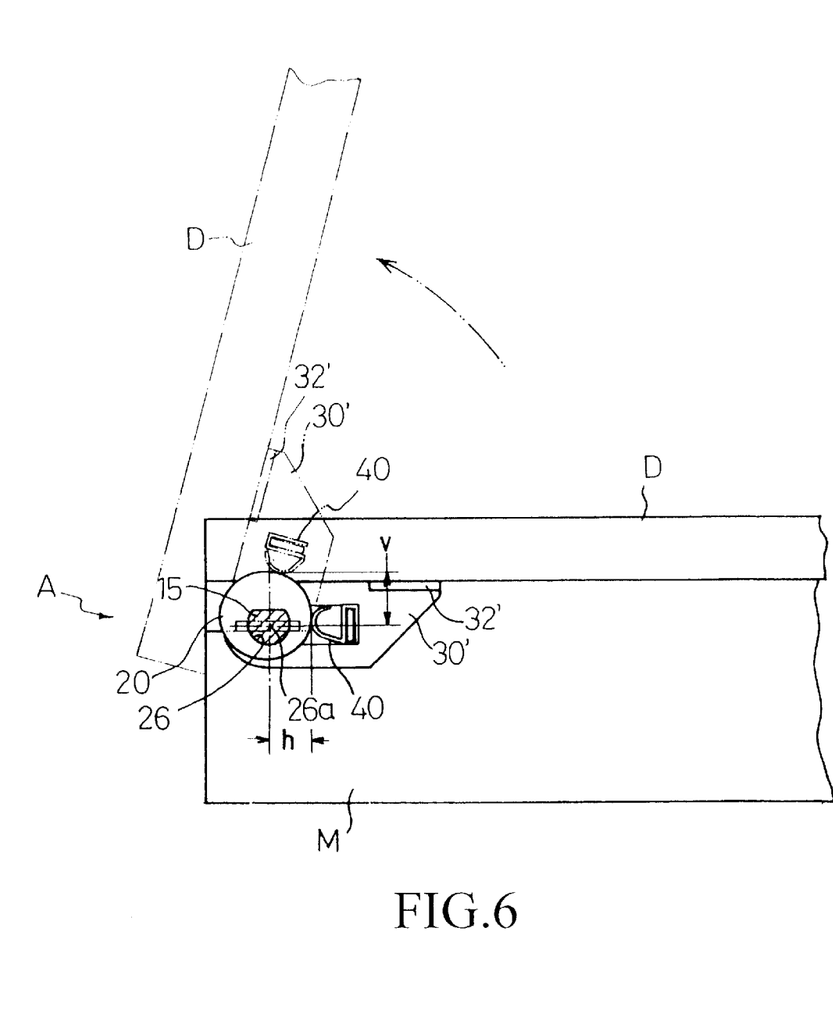
FIG. 6 is a schematic view illustrating the positioning hinge illustrated in FIG. 5 being assembled to a computer.

FIG. 6 is a schematic view illustrating the positioning hinge 1 illustrated in FIG. 5 being assembled to a computer A. Because the first end 62 (FIG. 1) of the torsion spring 60 is mounted to the non-rotatable washer 50 that is non-rotatable about the pivotal member 10 and the second end 64 is to the pivotal base 30' that is rotatable about the pivotal member 10, when a user releases fastening means (not shown) provided between the LCD display D and the main unit M, the torsion spring 60 returns to relaxed state from torsion state due to its resilience and subjects the LCD display D to automatically lift to a position that forms an angle in relation to the main unit M.

Because the semi-circular opening 26 is eccentrically formed on the cam block 20, the center 26a is spaced from a specific location of the peripheral wall 24 at a maximum distance. In this embodiment, because the center 26a of the semicircular opening 26 is located on a vertical axis of the cam block 20, a lateral distance h formed between the center 26a and the peripheral wall 24 of the cam block 20 is smaller than a vertical distance v formed between the center 26a and the peripheral wall 24 of the cam block 20, wherein the vertical distance v is the maximum distance between the center 26a and the peripheral wall 24. In accordance with this invention, the resilient friction member 40 has maximum deformation at the specific location of the peripheral wall 24 that forms a maximum distance with the center 26a and torque resulted from dynamic friction between the resilient friction member and the cam block 20 is maximum at this specific location, wherein the torque substantially counteracts torsion of the torsion spring 60. Therefore, when the pivotal base 30' is at the first position, the cam block 20 acts lesser damping effect on the resilient friction member 40. When the pivotal base 30' lifts up in response to resilience of the torsion spring 60, the cam block 20 and the resilient friction member 40 damp resilience of the torsion spring 60 and impede lifting action of the LCD display D until the LCD display D forms an angle in relation to the main unit M.

At this moment, the user may manipulate the LCD display D to an appropriate position. The LCD display D is maintained an the appropriate position due to the static friction between the cam block 20 and the resilient friction member 40.

Because the hinge structure of this invention features auto-lifting function for the LCD display, the user only needs to release fastening means provided between the LCD display and the main unit prior to using the computer such that the hinge 1 will subject the LCD display to automatically lift up to a position that forms an angle in relation of the main unit without needing to exert additional force.

Furthermore, the angle between the LCD display and the main unit is effortlessly adjusted due to inter-action between the cam block 20 and the resilient friction member 40 of the hinge structure.

Figures 8, 8A:
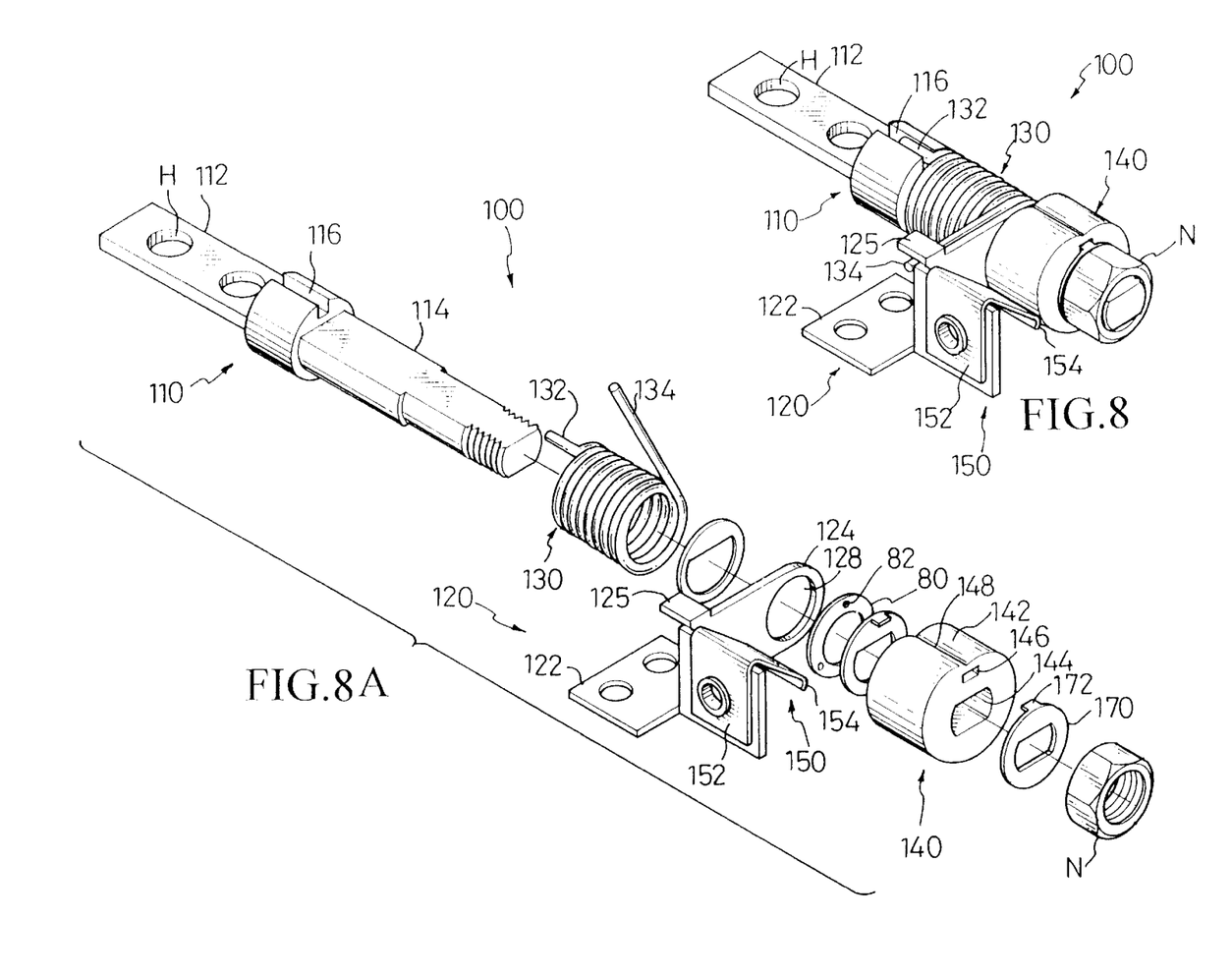
FIG. 8 is an assembled perspective view of a fourth embodiment of this invention.
FIG. 8A is an exploded perspective view of the embodiment illustrated in FIG.8.
Figure 9A:
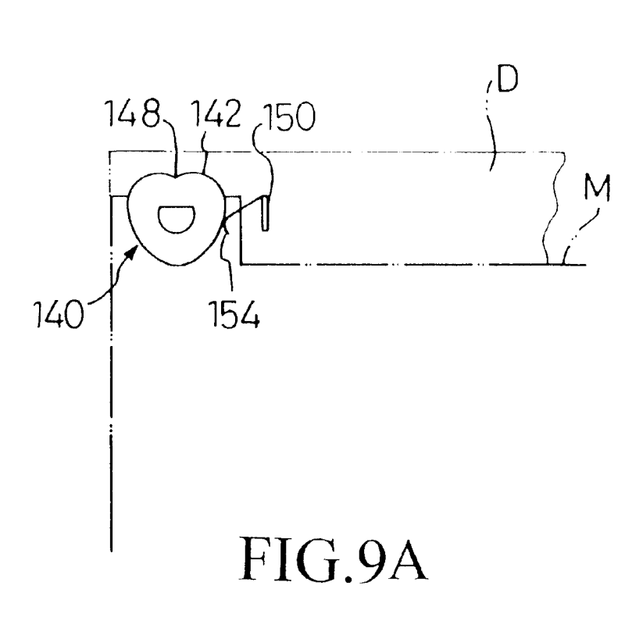
FIGS. 9A–9D are schematic views illustrating the positioning hinge illustrated in FIG. 8 being assembled to a computer.
Figure 9B:
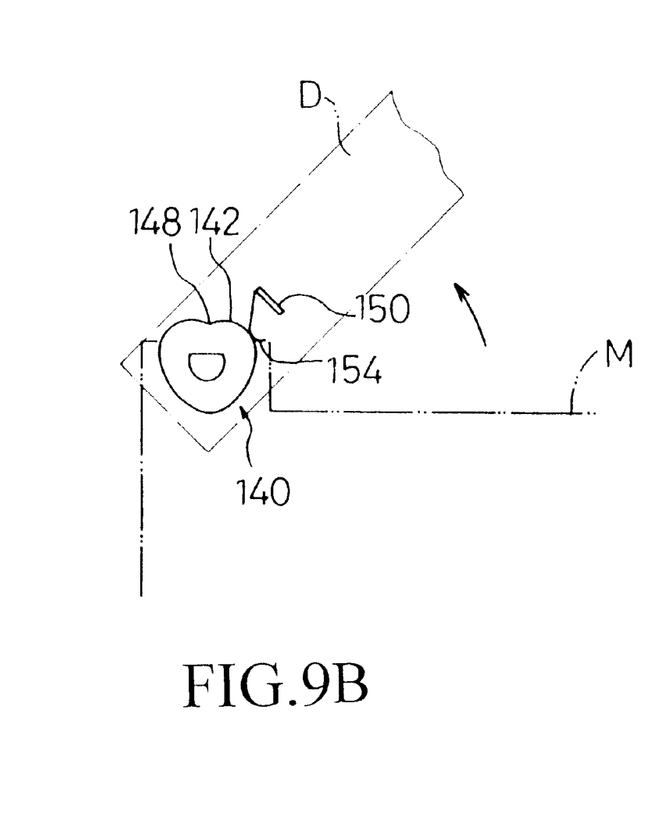
Figure 9C:
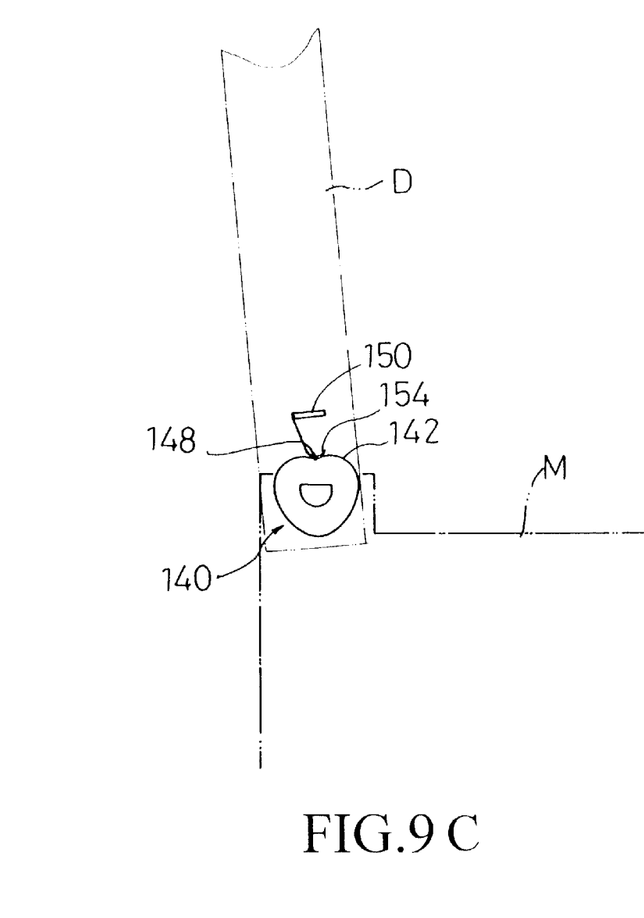
Figure 9D:
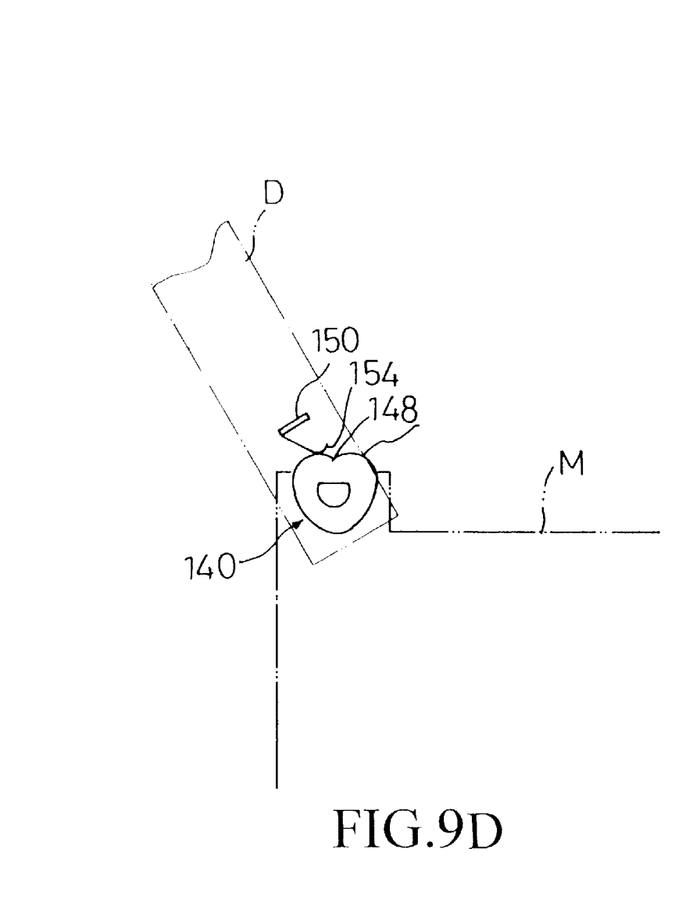

FIGS. 8 and 8A illustrate the assembled and exploded, perspective views of a fourth embodiment of this invention. The positioning hinge 100 mainly comprises a pivotal member 110, a pivotal base 120, a torsion spring 130, a cam block 140, a resilient friction member 150, and a fastening member N.

The pivotal member 10 includes a mounting end 112 and a rotary shaft 114, and is preferred to be formed with a channel 116. The mounting end 112 is formed with a hole H to allow the pivotal member 110 to be secured to the main unit M. The rotary shaft 114 includes a pivotal axis and is preferred to be extended in a columnar configuration.

The pivotal base 120 includes a mounting end 122 for mounting the pivotal base 120 to an LCD display D, and a first support 124, wherein the first support 124 is substantially perpendicular to the rotary shaft 114 of the pivotal member 110 and formed with a pivotal opening 128 through which the rotary shaft 114 passes.

The torsion spring 130 may be provided around the rotary shaft 114 and has a first end 132 and a second end 134 that, respectively, urge against and connect to the pivotal member 110 and pivotal base 120 to allow relative torsion motion between the pivotal member 110 and pivotal base 120 about the pivotal axis. In one embodiment, the first end 132 of the torsion spring 130 is received in the channel 116 of the pivotal member 110 and is thus joined to the pivotal member 110. The second end 134 urges against an ear 125 formed on the pivotal base 120.

The cam block 140 is in a disk shape and may be made of plastic materials having frictional and damping characteristics. The cam block 140 includes a cam-configured surface 142 and a axial through hole 144. The cam-configured surface 142 includes a surface region that forms about a peripheral wall of the cam block 140. The through hole 144 allows the rotary shaft 114 of the pivotal 110 to non-rotationally pass through. The cam block 140 is preferred to be formed with an opening 124 into which an ear 172 of a non-rotational washer 172 insert so as to further prevent the cam block 140 to rotate about the rotary shaft 114. The cam block 140 is preferred to be configured in a smooth heart shape having a positioning recess 148 that is formed on the cam-configured surface 142 along a transverse direction.

The resilient friction member 150 is mainly made of resilient materials, and includes a mounting end 152 for connecting to the pivotal base 120; and a friction end 154 extending to the cam block 140 for resiliently biasing against the cam-configured surface 142.

In this embodiment, a lubricating washer 80 having a plurality of lubricant holes 82 is provided between the first support 124 and abutting components. Lubricant may be added into the lubricant openings 82 so as to reduce unnecessary friction between the first support 124 and abutting components during pivotal motion of the pivotal base 120.

The fastening member N is a nut or may be other fastening devices. The fastening member N is secured to a free end of the rotary shaft 114 after the components (120, 130, 140, 150, and 180) are assembled to the rotary shaft 10 so that the positioning hinge 100 is constructed.

FIGS. 9A–9D are schematic views illustrating the operational states among the LCD display D, main unit M, cam block 140 and the friction end 154 of the resilient friction member 150 after the positioning hinge 100 is assembled to the computer. Prior to lifting the LCD display D, the LCD display D is maintained at a position that is closely connected to the main unit M by means of fastening means (such as fasteners); the spring 130 (not illustrated in FIGS. 9A–9D) are under torsion state; and the friction end 154 of the resilient friction member 150 urges against the cam-configured surface 142 of the cam block 140. When a user pushes a release switch (not shown) or opens the LCD display D by other means, resilience of the torsion spring 130 subjects the LCD display D to lift up automatically (FIG. 9B) such that the pivotal base 120 rotates about the pivotal axis. The resilient friction member 150 is secured to the pivotal base 120; the friction end 154 continues to resiliently urge against the cam-configured surface 142 and varies its frictional force with respect to configuration variation of the cam-configured surface 142; the friction end 154 of the resilient friction member 150 then stops within the positioning recess 148 to reach a fixed position. The user may further adjust the LCD display D (FIG. 9D) to attain an optimum viewing angle.

Figures 10, 10A:
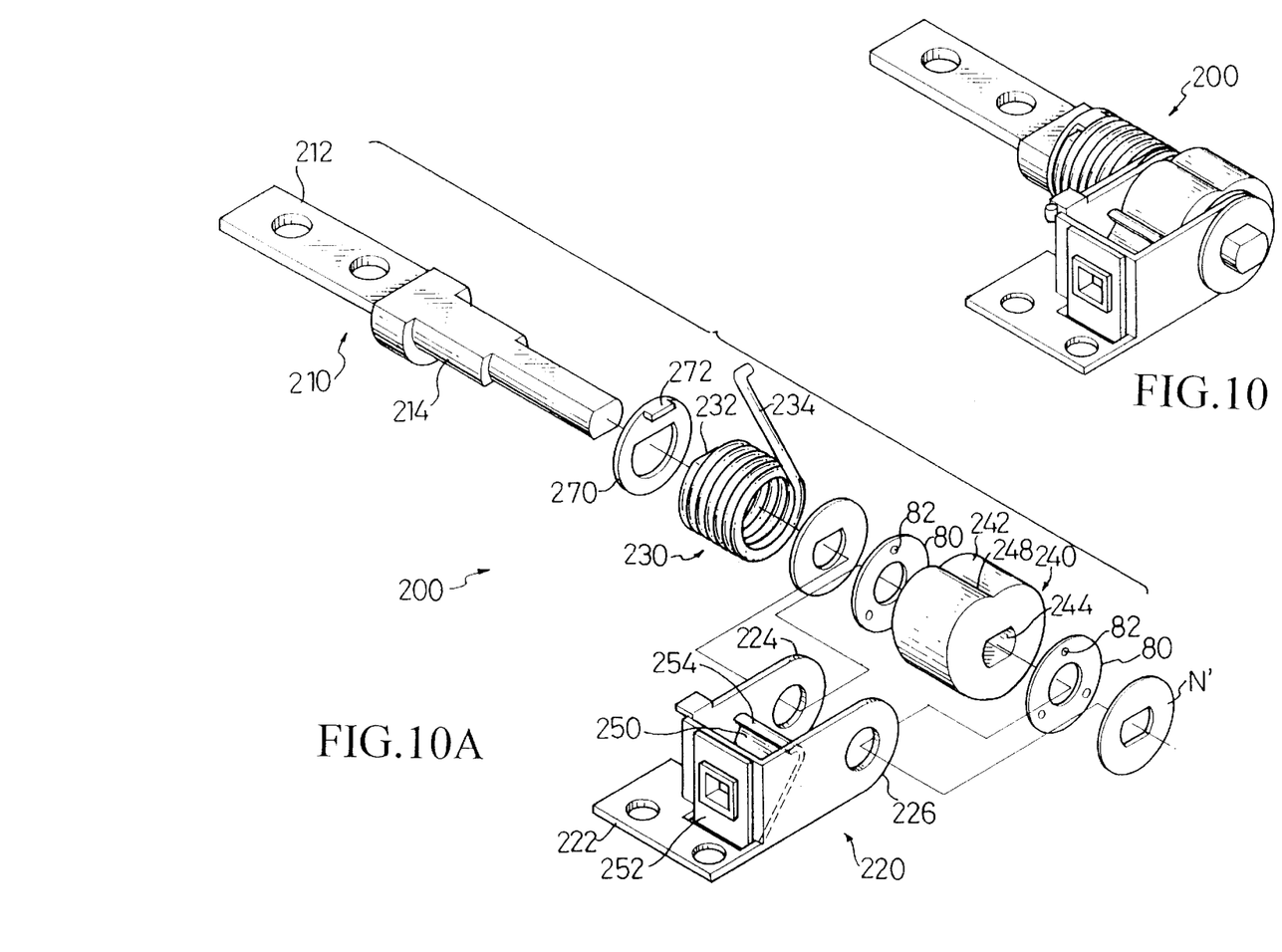
FIG. 10 is an assembled perspective view of a fifth embodiment of this invention.
FIG. 10A is an exploded perspective view of the embodiment illustrated in FIG. 10.
Figures 11, 11A:
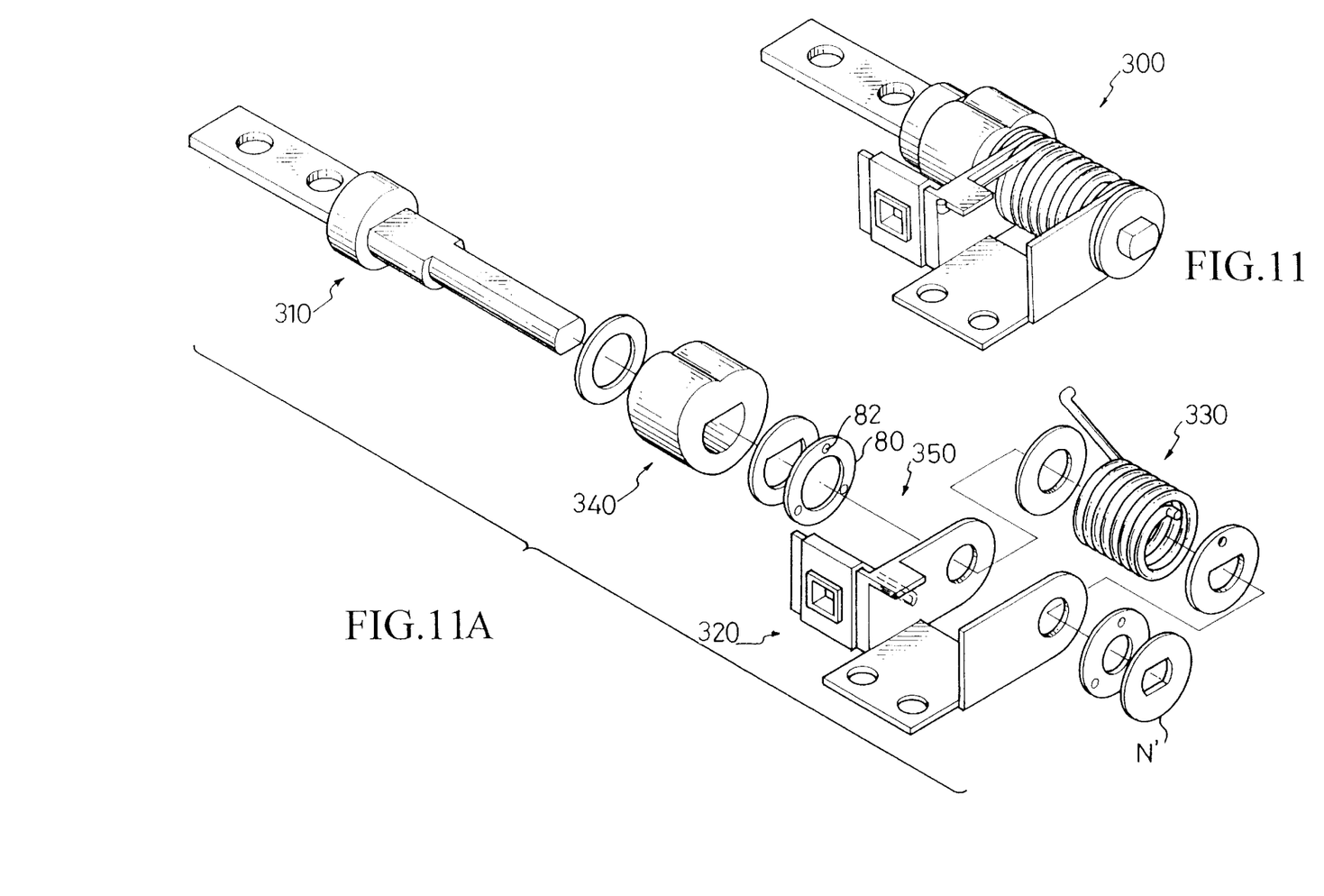
FIG. 11 illustrates an embodiment that is similar to that of FIG. 10.
FIG. 11A is an exploded perspective view of the embodiment illustrated in FIG. 11.
Figure 12:
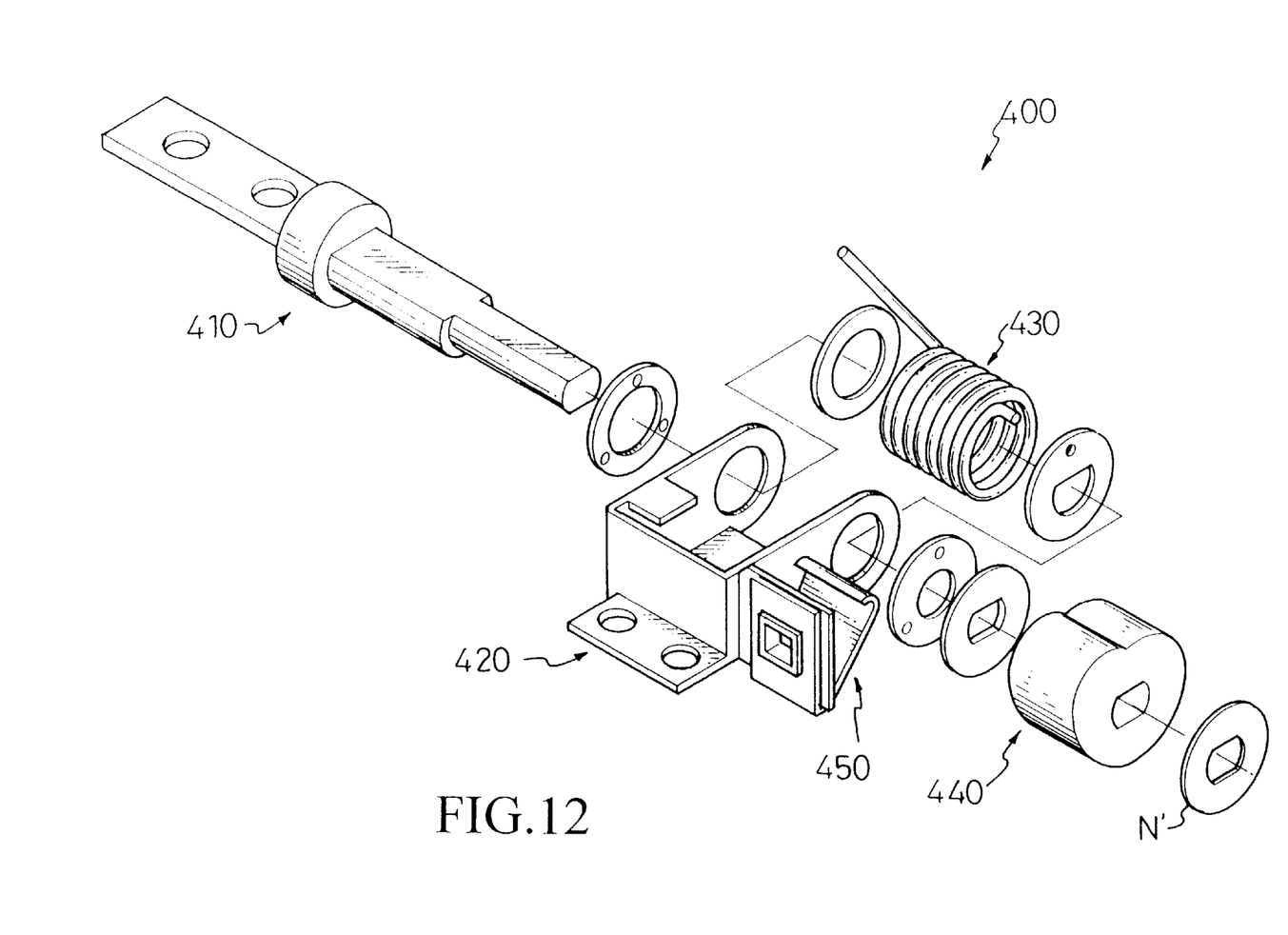
FIG. 12 is an assembled perspective view illustrating a further embodiment that is similar to that of FIG. 10.
Figure 13:
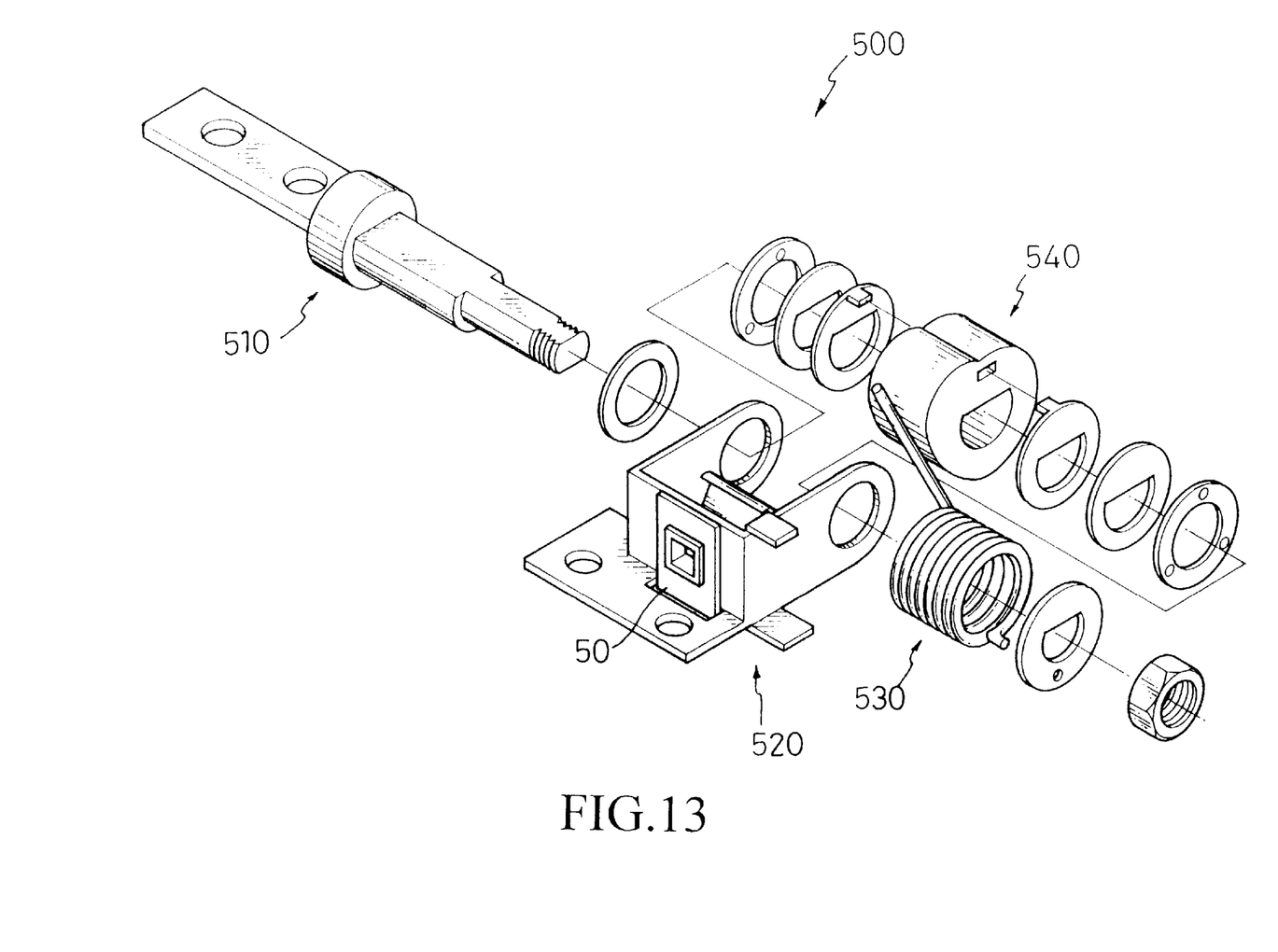
FIG. 13 is an assembled perspective view illustrating a further embodiment that is similar to that of FIG. 10.

FIGS. 10 and 11A illustrate the assembled and exploded, perspective views of a fifth embodiment of this invention. The positioning hinge 200 comprises a pivotal member 210, a pivotal base 220, a torsion spring 230, a cam block 240, a resilient friction member 250, and a fastening member N'. The pivotal member 210 includes a mounting end 212 and a rotary shaft 214. The pivotal base 220 includes a mounting end 222, a first and a second supports 224, 226 that are spaced apart from each other and formed with pivotal openings 228. The first and the second supports 224, 226 are substantially perpendicular to the rotary shaft 214. The torsion spring 230 includes a first end 232 and a second end 234 that respectively urge against and connect to the pivotal member 210 and the pivotal base 220. In this embodiment, a detachable stop plate 270 is non-rotationally provided around the rotary shaft 214. The stop plate 270 includes a stop portion 272 that is connected to the second end 232 of the torsion spring 230. The cam block 240 includes a cam-configured surface 242 that is formed with a through hole 244 through which the pivotal member 210 non-rotationally passes. The cam block 240 is substantially configured in a smooth heart shape having a positioning recess 248 that is formed on the cam-configured surface 242 along a transverse direction. The resilient friction member 250 includes a mounting end 252 and a friction end 254. The mounting end 252 is connected to the pivotal base 220 and the friction end 254 is resiliently biased against the cam-configured surface 242 of the cam block 240. The fastener N' is secured to a free end of the rotary shaft 214. Operations of the positioning hinge 200 are identical to those shown in FIGS. 9A–9D.

The positioning hinges 300, 400, 500 illustrated in FIGS. 11–11A, 12, and 13, respectively are variations of the positioning hinge 200 illustrated in FIGS. 10–10A, wherein the primary differences reside in the relative locations of the pivotal members (210, 310, 410, 510), pivotal bases (220, 320, 420, 520), torsion springs (230, 330, 430, 530), cam blocks (240, 340, 440, 540), and resilient friction members (250, 350, 450, 550) of the positioning hinges (200, 300, 400, 500). Operations of the these variations are identical to those shown in FIGS. 9A–9D.

Aforementioned explanations are directed to the description of several preferred embodiments according to the present invention. Various changes and implementations can be made by those skilled in the art without departing from the technical concept of the present invention. Since the present invention is not limited to the specific details described in connection with the preferred embodiments except those that may be within the scope of the appended claims, changes to certain features of the preferred embodiments without altering the overall basic function of the invention are contemplated.

What is claimed is:

1. A positioning hinge for pivoting between a main unit and an LCD display of a portable computer or an electronic dictionary, the hinge comprising:

a pivotal member having a mounting end for mounting the hinge to the main unit, and a rotary shaft having a pivotal axis;

a substantially disk-shaped cam block being eccentrically and non-rotatably provided around the rotary shaft of the pivotal member;

a pivotal base having a mounting end for mounting the hinge to the LCD display, and a support through which the rotary shaft passes; the pivotal base being provided with a resilient friction member resiliently urging against the cam block, wherein the pivotal base is rotatable between a first position and a second position about the pivotal member; and a torsion spring being biasedly provided around the rotary shaft in relation to the pivotal member, wherein the torsion spring is under torsion state when the pivotal base is at the first position, and under relaxed state when the pivotal base is at the second position.

2. The positioning hinge as set forth in claim 1, wherein the mounting end and the support of the pivotal base are bent to form an angle.

3. The positioning hinge as set forth in claim 1, wherein the mounting end and the support of the pivotal base are bent to form a right angle.

4. The positioning hinge as set forth in claim 1, further comprising two lubricating washers being rotatably provided around the pivotal member on opposing sides of the pivotal base.

5. The positioning hinge as set forth in claim 4, further comprising two locking washers being rotatably provided around the rotary shaft of the pivotal member on opposing sides of the pivotal base.

6. The positioning hinge as set forth in claim 5, further comprising two tooth-shaped resilient tabs provided around the rotary shaft of the pivotal member between one of the lubricating washers and one of the locking washers.

7. A positioning hinge for pivoting between a main unit and an LCD display of a portable computer or an electronic dictionary, the hinge comprising:

a pivotal member having a mounting end for mounting the hinge to the main unit, and a rotary shaft formed with a pivotal axis;

a substantially disk-shaped cam block having a peripheral wall and, being eccentrically provided around the rotary shaft of the pivotal member;

a pivotal base having a mounting end for mounting the hinge to the LCD display; a support being formed with a substantially circular opening for rotatably receiving the rotary shaft of the pivotal member; and a medial portion being formed with an ear projecting towards the cam block, wherein the pivotal base is rotatable between a first position and a second position about the pivotal axis of the pivotal member;

a resilient friction member having a mounting end for mounting the resilient friction member on the ear, and a resilient end for resiliently urging against the peripheral wall of the cam block;

a non-rotatable washer being formed with an oblate opening having a top flatten edge and a bottom flatten edge for non-rotatably providing the non-rotatable washer on the rotary shaft of the pivotal member; and a torsion spring being biasedly provided around the rotary shaft of the pivotal member in relation to the pivotal member, the torsion spring having a first end for mounting on the non-rotatable washer, and a second end for mounting on the pivotal base;

wherein the torsion spring is under torsion state when the pivotal base is at the first position, and under relaxed state when the pivotal base is at the second position.

8. The positioning hinge as set forth in claim 7, wherein the mounting end and the support of the pivotal base are bent to form an angle.

9. The positioning hinge as set forth in claim 7, wherein the mounting end and the support of the pivotal base are bent to form a right angle.

10. The positioning hinge as set forth in claim 7, further comprising two lubricating washers being provided around the rotary shaft of the pivotal member on opposing sides of the pivotal base.

11. The positioning hinge as set forth in claim 10, further comprising two lock washers being provided around the rotary shaft of the pivotal member on opposing sides of the pivotal base.

12. The positioning hinge as set forth in claim 11, further comprising two tooth-shaped resilient tabs provided around the rotary shaft of the pivotal member between one of the lubricating washers and one of the locking washers.

13. The positioning hinge as set forth in claim 11, further comprising a compression spring provided around the rotary shaft of the pivotal member between one of the lubricating washers and one of the locking washers.

14. A positioning hinge for pivoting between a main unit and an LCD display of a portable computer or an electronic dictionary, the hinge comprising:

a pivotal member having a pivotal axis, a mounting end for mounting the hinge to the main unit; a non-threaded portion; and a threaded portion, wherein the non-threaded portion is located between the mounting end and the threaded portion;

a substantially disk-shaped cam block having a center and a peripheral wall;

the cam block being formed with an eccentric semi-circular opening having a center for non-rotatably mounting the cam block on the non-threaded portion of the pivotal member;

a pivotal base having a mounting end for mounting the hinge to the LCD display; a support being formed with a substantially circular opening for rotably receiving the non-threaded portion of the pivotal member; and a medial portion being formed with an ear projecting towards the cam block, wherein the pivotal base is rotatable between a first position and a second position about the pivotal axis of the pivotal member;

a resilient friction member having a mounting end for mounting the resilient friction member on the ear, and a resilient end for resiliently urging against the peripheral wall of the cam block;

a non-rotatable washer being formed with an oblate opening having a top flatten edge and a bottom flatten edge for non-rotatably receiving the threaded portion of the pivotal member; and a torsion spring being biasedly provided around the threaded-portion of the pivotal member and between the pivotal base and the non-rotatable washer, the torsion spring having a first end for mounting on the non-rotatable washer, and a second end for mounting on the pivotal base;

wherein the torsion spring is under torsion state when the pivotal base is at the first position, and under relaxed state when the pivotal base is at the second position.

15. The positioning hinge as set forth in claim 14, wherein the mounting end and the support of the pivotal base are bent to form an angle.

16. The positioning hinge as set forth in claim 14, wherein the mounting end and the support of the pivotal base are bent to form a right angle.

17. The positioning hinge as set forth in claim 14, further comprising two lubricating washers being provided around the non-threaded and threaded portions of the pivotal member on opposing sides of the pivotal base.

18. The positioning hinge as set forth in claim 17, further comprising two lock washers being provided around the non-threaded and threaded portions of the pivotal member on opposing sides of the pivotal base.

19. The positioning hinge as set forth in claim 18, further comprising two tooth-shaped resilient tabs provided around the threaded portions of the pivotal member between one of the lubricating washers and one of the locking washers.

20. The positioning hinge as set forth in claim 18, further comprising a compression spring provided around the threaded portion of the pivotal member between one of the lubricating washers and one of the locking washers.

21. The positioning hinge as set forth in claim 14, wherein a lateral distance is formed between the center of the semi-circular opening and the peripheral wall of the cam block and a vertical distance between the center of the semi-circular opening and the peripheral wall of the cam block, wherein the lateral distance is smaller than the vertical distance.

22. A positioning hinge for pivoting between a main unit and an LCD display of a portable computer or an electronic dictionary, the hinge comprising:

a pivotal member having a mounting end for mounting the pivotal member to the main unit, and a rotary shaft having a pivotal axis;

a pivotal base having a mounting end for mounting the pivotal base to the LCD display, and a first support that is substantially perpendicular to the rotary shaft of the pivotal member and is formed with a pivotal opening through which the rotary shaft passes;

a torsion spring provided around the rotary shaft and having a first end and a second end that respectively urge against and connect to the pivotal member and pivotal base to provide torsion force for relative rotation between the pivotal member and the pivotal base;

a cam block substantially in a disk shape and having a cam-configured surface and is formed with a through hole, through which the rotary shaft of the pivotal member non-rotatably passes;

resilient friction member including a mounting end that is secured to the pivotal base and a friction end that biases against the cam-configured surface so as to maintain frictional, sliding movement with the cam block;

wherein the pivotal member, pivotal base, torsion spring, cam block, and resilient friction member are secured to the rotary shaft from a free end of the rotary shaft.

23. The positioning hinge as set forth in claim 22, wherein the cam block is substantially configured in a smooth heart shape forming a positioning recess at a top of the cam block to allow the friction end of the resilient friction member to maintain frictional, sliding movement with the cam-configured surface of the cam block and then to stop within the positioning recess.

24. The positioning hinge as set forth in claim 23, wherein the pivotal base further includes a second support that is substantially identical to the first support and that is spaced from the first support in parallel.

25. The positioning hinge as set forth in claim 22, wherein the pivotal member is formed with a notch for receiving the first end of the torsion spring.

26. The positioning hinge as set forth in claim 25, wherein the pivotal base further includes a second support that is substantially identical to the first support and that is spaced from the first support in parallel.

27. The positioning hinge as set forth in claim 22, wherein the pivotal member further includes a detachable stop plate that is non-rotationally provided around the rotary shaft and includes a stop portion that is connected to the second end of the torsion spring.

28. The positioning hinge as set forth in claim 27, wherein the pivotal base further includes a second support that is substantially identical to the first support and that is spaced from the first support in parallel.

29. The positioning hinge as set forth in claim 22, wherein the free end of the rotary shaft is provided with a gasket and/or a nut for securing the pivotal member, pivotal base, torsion spring, cam block, and resilient friction member to the rotary shaft.

30. The positioning hinge as set forth in claim 29, wherein the pivotal base further includes a second support that is substantially identical to the first support and that is spaced from the first support in parallel.

31. The positioning hinge as set forth in claim 22, wherein the rotary shaft is extended in a columnar configuration.

32. The positioning hinge as set forth in claim 31, wherein the pivotal base further includes a second support that is substantially identical to the first support and that is spaced from the first support in parallel.

33. The positioning hinge as set forth in claim 22, wherein the pivotal base further includes a second support that is substantially identical to the first support and that is spaced from the first support in parallel.

34. The positioning hinge as set forth in claim 33, wherein the cam block is non-rotationally provided around the rotary shaft and is provided between the first support and the second support.

35. The positioning hinge as set forth in claim 33, wherein the torsion spring is provided around the rotary shaft and is provided between the first support and the second support.

* * * * *